United States Patent
Aulagnier

(10) Patent No.: US 9,948,097 B2
(45) Date of Patent: Apr. 17, 2018

(54) METHOD FOR CONTROLLING THE ELECTRICAL POWER DELIVERED OVER AN ELECTRICAL SUPPLY NETWORK BY AT LEAST TWO ELECTRICAL ENERGY SOURCES AND ASSOCIATED ELECTRICAL SYSTEM

(71) Applicant: Schneider Electric Industries SAS, Rueil-Malmaison (FR)

(72) Inventor: Vincent Aulagnier, Grenoble (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 362 days.

(21) Appl. No.: 14/790,270

(22) Filed: Jul. 2, 2015

(65) Prior Publication Data

US 2016/0006244 A1    Jan. 7, 2016

(30) Foreign Application Priority Data

Jul. 4, 2014    (FR) ...................... 14 56484

(51) Int. Cl.
*H02J 3/04*    (2006.01)
*H02J 3/12*    (2006.01)
(Continued)

(52) U.S. Cl.
CPC ............... *H02J 3/00* (2013.01); *G06Q 50/06* (2013.01); *H02J 3/04* (2013.01); *H02J 3/12* (2013.01); *H02J 3/32* (2013.01); *H02J 3/38* (2013.01)

(58) Field of Classification Search
CPC ........ H02J 3/00; H02J 3/04; H02J 3/12; H02J 3/28; H02J 3/32; H02J 3/38; H02J 7/34
(Continued)

(56) References Cited

U.S. PATENT DOCUMENTS 8,345,454 B1 *   1/2013  Krolak ................... H02M 7/42
                                                          307/31
9,660,451 B1 *   5/2017  Naiknaware ............. H02J 3/38
(Continued)

OTHER PUBLICATIONS

French Preliminary Search Report dated Apr. 9, 2015 in French Application 14 56484, issued on Jul. 4, 2014 (with English Translation of Categories of Cited Documents).
(Continued)

*Primary Examiner* — Levi Gannon
(74) *Attorney, Agent, or Firm* — Oblon, McClelland, Maier & Neustadt, L.L.P.

(57) ABSTRACT

In this control method for controlling the electrical power delivered over an electrical supply network (20) by at least two sources (16) of electrical energy, each energy source (16) comprises a storage member (22) for storing electrical energy. The method includes for each energy source (16) the following steps:
  the application by the electrical energy source (16) of an alternating current voltage signal over the electrical supply network (20);
  the measurement of an associated electrical power;
  the determination of an electrical energy stored in the storage member (22);
  the calculation of a set point value for the voltage signal parameter as a function of the measured power;
  the modification of the voltage signal, the value of the voltage signal parameter being modified so as to be equal to the calculated set point value.
During the calculation step, the set point value is calculated additionally as a function of the stored electrical energy determined.

9 Claims, 6 Drawing Sheets

(51) Int. Cl.
  *H02J 3/32* (2006.01)
  *H02J 3/38* (2006.01)
  *H02J 3/00* (2006.01)
  *G06Q 50/06* (2012.01)

(58) Field of Classification Search
  USPC .................................................... 307/52, 84
  See application file for complete search history.

(56) References Cited

U.S. PATENT DOCUMENTS

| | | | |
|---|---|---|---|
| 2004/0070280 A1* | 4/2004 | Nakata | H02J 3/32 307/69 |
| 2006/0092588 A1* | 5/2006 | Realmuto | H02J 1/10 361/62 |
| 2010/0090532 A1 | 4/2010 | Shelton et al. | |
| 2014/0265606 A1* | 9/2014 | Gazit | H02J 7/0018 307/82 |

OTHER PUBLICATIONS

Pardis Khayyer et al. "Decentralized Control of Large-Scale Storage-Based Renewable Energy Systems", IEEE Transactions on Smart Grid, vol. 5, No. 3, May 2014, 8 pages.

Xiaonan Lu et al. "SoC-Based Dynamic Power Sharing Method with AC-Bus Voltage Restoration for Microgrid Applications", IECON 2012—38$^{th}$ Annual Conference on IEEE Industrial Electronics Society, Oct. 25, 2012, 6 pages.

Xiangjun Li et al. "Battery Energy Storage Station (BESS)-Based Smoothing Control of Photovoltaic (PV) and Wind Power Generation Fluctuations", IEEE Transactions on Sustainable Energy, vol. 4, No. 2, Apr. 2013, 10 pages.

\* cited by examiner

METHOD FOR CONTROLLING THE ELECTRICAL POWER DELIVERED OVER AN ELECTRICAL SUPPLY NETWORK BY AT LEAST TWO ELECTRICAL ENERGY SOURCES AND ASSOCIATED ELECTRICAL SYSTEM

The present invention relates to a control method for controlling the electrical power delivered over an electrical supply network by at least two sources of electrical energy and an associated electrical system comprising at least two sources of electrical energy connected to an electrical supply network.

In the field of electrical power supply of an electrical supply network to which loads are connected, an electrical system is known that comprises a main electrical power supply member, capable of supplying electrical power to the loads via the network, as well as sources of electrical energy, also known as electrical energy supply units, connected to the electrical supply network. In the following sections of the description, the example will be considered in which the electrical energy supply units correspond to electrical energy storage units connected to the electrical supply network. However, it is known that the electrical energy supply units considered in such an electric system correspond more generally to voltage sources connected to the electrical supply network. Thus, in such a system, the storage units are capable of supplying electrical power to the loads in case of failure of the main electrical power supply member, and more specifically in the event of stoppage of the electrical power supply to the loads by the main electrical power supply member, the latter then no longer supplying electrical power to the loads and no longer ensuring the maintenance of a stable frequency and a stable voltage over the network.

More precisely, the electrical energy storage units each comprise an electrical energy storage member and a control module for controlling the storage member. The storage units are capable of operating as voltage sources when the main electrical power supply member fails. The storage units are connected in parallel to the network.

A known problem in such an electrical system is to ensure the distribution among the storage units, that is to say, more generally among the electrical energy supply units, of the electrical power to be delivered to the loads. Indeed, the objective is to ensure that the electrical power required by the loads is equitably and evenly delivered by the storage units, according to their rated power.

A second problem encountered in such a system is to perform the distribution of electrical power delivered without using a system of supervision of all the storage units, that is to say, by having independent storage units.

It is thus a known technique from the document "*Control of Distributed Uninterruptible Power Supply Systems*" by Josep M Guerrero, L H published in August 2008 in the journal, *Transactions on industrial electronics*, to use a method known as (static) droop control, in order to distribute electrical power to be delivered to the loads between the electrical energy supply units, for example corresponding to storage units, which are independent of each other. According to this method, each storage unit is capable of delivering a voltage signal over the network with a frequency and an amplitude that get adapted, as a function of the measured active and reactive power being outputted from the storage unit. More precisely, at the time of stopping of the electrical power supply of the loads by the main electrical power supply member following a failure, the control module of each storage unit is configured so as to output over the network a voltage signal with a maximal frequency F' and a maximal amplitude A', corresponding to a voltage and an amplitude to be delivered over the network when no load is connected to the network. Then, each control module measures the active and reactive electric power supplied to the network, being outputted from the corresponding storage unit, and causes the value of the amplitude and the value of the frequency of the voltage signal to vary in accordance with the following equations:

$$F = F' - K_w * (P*\sin(\theta) - Q*\cos(\theta)) \quad (1)$$

$$A = A' - K_A * (P*\sin(\theta) + Q*\cos(\theta)) \quad (2)$$

where $\theta$ is the phase of the complex impedance of the network, the latter being equal to 0° for a resistive network and 90° for an inductive network;
A is the amplitude of the voltage signal, F is the frequency of the voltage signal, P is the active power, Q is the reactive power; and
$K_w$ and $K_A$ are the coefficients that are configurable.

Thus, in the case of a resistive network the following equations are obtained:

$$F = F' + K_w * Q \quad (3)$$

$$A = A' - K_A * P \quad (4)$$

Such a control method makes it possible to compensate, in an electrical system such as the one set forth here above, for the fact that when a load is connected to the network, the storage unit, that is to say, more generally the electrical energy supply unit, for which the impedance between itself and the load is the lowest, will deliver proportionally to its rated power a share of electric power over the network that is greater than that of other storage devices. In addition, it is known for each storage unit that the power delivered over the electrical power supply network by the storage unit increases with the frequency and amplitude of the voltage signal outputted by the storage unit. Thus, in the example of a resistive network, the act of causing varying of the amplitude of the voltage signal, via the equation (4) presented here above, enables the retroactive control of the voltage signal output by each storage unit and provides the ability to ensure the distribution, among a plurality of storage units, of the electrical power to be supplied to the loads connected to the network.

However, the said droop control method presents certain disadvantages as regards the time period during which the electrical energy storage units supply electrical power to the loads connected on the network and the management of electrical energy stored in the storage units, particularly where the storage units do not store the same amount of electrical energy.

The aim of the invention is therefore to provide a control method for controlling the electrical power delivered to an electrical supply network by a plurality of storage units, that allows for distribution of the electrical power delivered among the various different storage units and provides the ability to supply electrical power to the loads connected on the network for a longer period of time and with an optimised discharge of the electrical energy storage units, in order to use to the maximum the electrical energy stored in the storage units.

To this end, the invention relates to a control method for controlling the electrical power delivered over an electrical supply network by at least two sources of electrical energy, each electrical energy source being connected to the network and comprising a storage member for storing electrical energy, the method including for each electrical energy source the following steps:

the application by the electrical energy source of an alternating current voltage signal over the electrical supply network for the supplying of electrical power to the network, with a parameter of the voltage signal having a predetermined initial value;

the measurement of an electrical power associated with the voltage signal applied;

the determination of an electrical energy stored in the storage member;

the calculation of a set point value for the parameter of the voltage signal as a function of the measured power;

the modification of the voltage signal, the value of the voltage signal parameter being modified so as to be equal to the calculated set point value.

According to the invention, during the calculation step, the set point value is calculated in addition, as a function of the stored electrical energy determined.

By making use of the invention, the distribution of electrical power to be delivered over the network by the source or sources of energy is improved, via the control and modification of the parameter of the voltage signal as a function of the electrical energy stored in the storage member of each energy source. The discharge of each electrical energy source, and more precisely of the corresponding storage member, is optimised and the length of time during which each energy source is capable of supplying power to the network is increased. The electrical energy stored in each storage member is thus used to the maximum According to advantageous aspects of the invention, the control method further includes one or more of the following characteristic features, taken into consideration in isolation or in accordance with all technically possible combinations:

the parameter of the voltage signal is selected from an amplitude of the voltage signal and a frequency of the voltage signal, depending on the type of network;

during the calculation step, the set point value is a decreasing function of the electrical power and an increasing function of the stored electrical energy;

previously during the calculation step, the method includes, for each energy source, a step of recording and storing of a value for maximal electrical energy that is able to be stored by the storage member and, during the calculation step, the set point value is a function of a first ratio between the stored electrical energy and the maximal electrical energy;

during the calculation step, the set point value is determined based on a first affine function, the first affine function being dependent on the measured electrical power and having a negative slope;

the first affine equation satisfies the following equation:

$$B_{ij} = B' - \left(K1_j - K2_j * \frac{ES_{ij}}{ESM_j}\right) * P_{ij},$$

where i, j are integer indices corresponding respectively to a given time instant and to an identifier of the electrical energy source, B' is a desired value for the parameter of the voltage signal when the electrical energy source is connected to the network and no load is connected to the network, and $P_{ij}$, $ES_{ij}$, $ESM_j$, $B_{ij}$, $K1_j$, and $K2_j$ are respectively the power, the stored electrical energy, the maximal electrical energy, the set point value, a first coefficient of predetermined value and a second coefficient of predetermined value, each energy source is capable of delivering a maximal power to the network; and a product between, on the one hand, the difference between the first coefficient and the second coefficient and, on the other hand, the maximal power is identical for each of the energy sources;

each energy source is capable of delivering a maximal power to the network and in order for the parameter of the voltage signal to be greater than a minimal operating value and, for each energy source, during the calculation step, the set point value is equal to the minimal operating value when the measured electrical power is equal to the maximal power;

during the calculation step, the set point value is calculated based on a continuous piecewise linear function which is equal to the first affine function for a first power interval and to a second affine function for a second power interval, the second interval comprising the maximal power, and the lower bound of the second interval being greater than or equal to the upper bound of the first interval;

each energy source is capable of delivering a maximal power $Pn_j$ to the network and in order for the parameter of the voltage signal to be greater than a minimal operating value $B_{min}$ and, during the calculation step, the voltage signal parameter is calculated on the basis of the following equation:

$$B_{ij} = B' - \left(\frac{(B' - B_{min})}{Pn_j}\right) * P_{ij} + dk * (C_{ij} - 0.5) * P_{ij}^{1+C_{ij}} * (Pn_j - P_{ij})^{2-C_{ij}};$$

with $C_{ij} = \frac{ES_{ij}}{ESM_j}$ where i, j are integer indices corresponding respectively to a given time instant and to an identifier of the electrical energy source, B' is a desired value for the parameter of the voltage signal when the electrical energy source is connected to the network and no load is connected to the network, dk is a parameter of predetermined value, and $P_{ij}$, $ES_{ij}$, $ESM_j$, $B_{ij}$, are respectively the power, the stored electrical energy, the maximal electrical energy, and the set point value.

The invention also relates to an electrical system comprising at least two sources of electrical energy, each electrical energy source being connected to the electrical supply network and comprising a storage member for storing electrical energy, and a control module for controlling the storage member, each control module comprising:

a signal application unit for applying an alternating voltage signal over the electrical supply network for the supply of electrical power to the network, with a parameter of the voltage signal having a predetermined initial value;

measurement means for measuring an electrical power associated with the voltage signal applied;

determination means for determining an electrical energy stored in the storage member;

calculation means for calculating a set point value of the voltage signal parameter as a function of the measured power; and signal modification means for modifying the voltage signal that is capable of modifying the value of the voltage signal parameter in order for the value of the voltage signal parameter to be equal to the calculated set point value.

In accordance with the invention, the calculation means are capable of calculating the set point value as a function moreover of the stored electrical energy determined.

The invention will be better understood and other advantages thereof will become apparent in the light of the description which follows, given solely by way of non limiting example and with reference being made to the accompanying drawings, in which.

Figure 1:
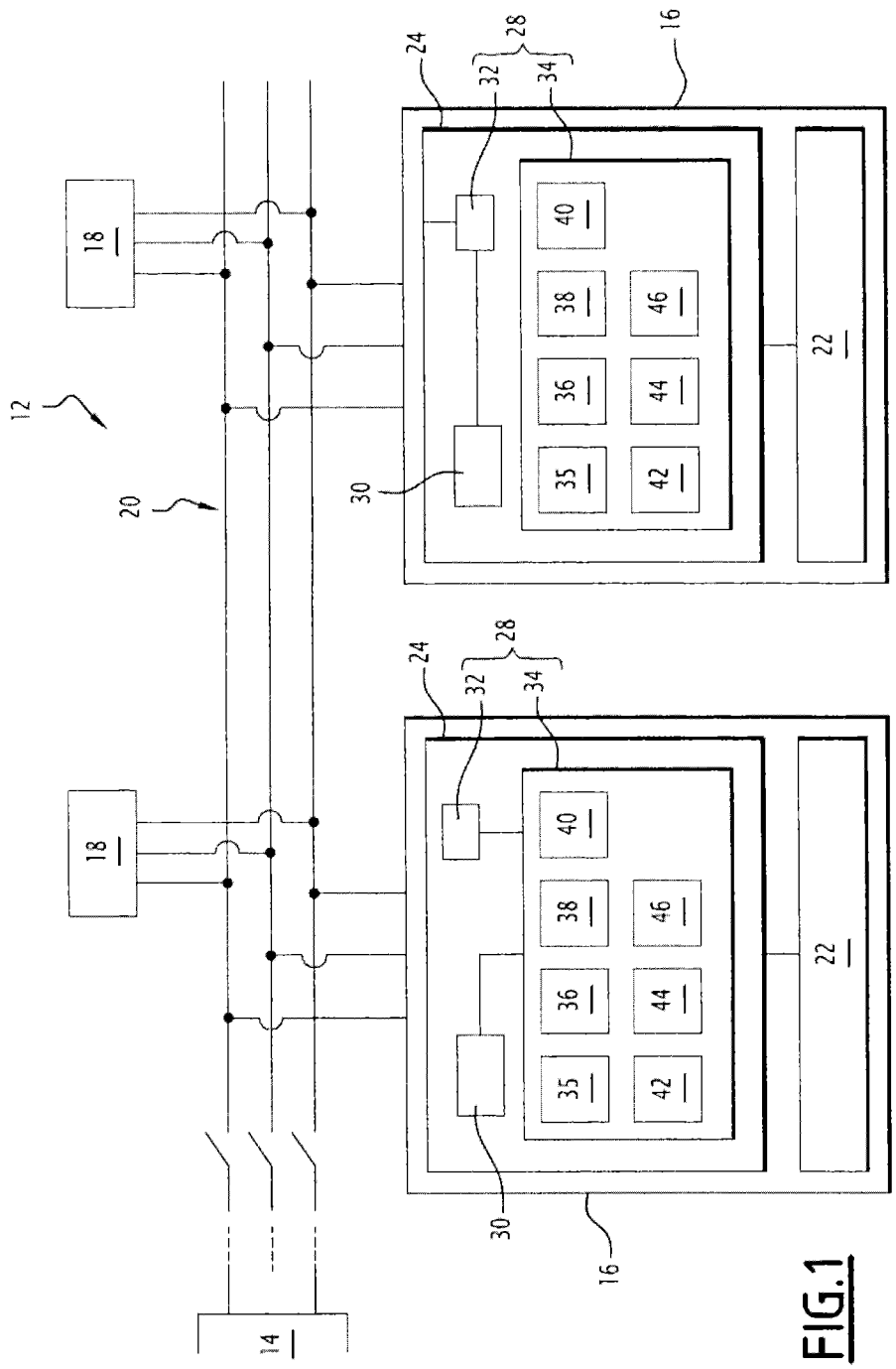
FIG. 1 is a schematic representation of an electrical system according to a first embodiment of the invention, the system comprising a plurality of electrical energy sources connected to an electrical supply network of the resistive type.

An electrical system 12 according to a first embodiment of the invention is presented in FIG. 1. The electrical system 12 includes a main electrical power supply member 14, two sources of electrical energy 16, such as storage units 16, and two electrical loads 18 connected to an electrical supply network 20.

In FIG. 1, the main electrical power supply member 14 is disconnected from the electrical supply network 20 and no longer supplies power to the electrical supply network 20 and the loads 18.

The storage units 16 are connected to the electrical supply network 20 and intended for use for supplying electrical power to the loads 18, when the main electrical power supply member 14 is disconnected from the network 20.

The storage units 16 each comprise of a storage member 22 for storing electrical energy and a control module 24 for controlling the storage member 22. The storage units 16 are configured so as to output a local alternating current voltage signal $S1_{ij}$ over the electrical supply network 20, in order to supply electrical power to the loads 18, with j being an integer index corresponding to a number of the storage unit 16 and i being an integer index corresponding to a given time instant. The storage units 16 are connected to the network 20 in parallel relative to each other.

The loads 18 are intended to be supplied with power via the electrical supply network 20 and are designed to consume a first electrical power P18 when they are connected to the network 20. In other words, the loads 18 are capable, when connected to the network 20, of requesting the first electrical power P18 and the storage units 16 are designed to supply the electrical power requested P18. In the following sections, the description will consider more particularly, the active electrical power to be delivered to the loads 18, the active electrical power being positive when the power flow circulates from the storage units 16 to the loads 18.

The electrical supply network 20 is a three-phase network designed for supplying power to the electrical loads 18. The electrical supply network 20 may be considered as akin to a low voltage network. In the following section, it is considered that the electrical supply network 20 is of the resistive type.

By way of a variant, the electrical supply network 20 is a single phase network.

The electrical loads 18 and the electrical supply network 20 are configured so as to operate with minimal electrical operating values, that is to say with an overall alternating current voltage signal S2, the parameters of which are greater than the operating boundary parameters. By way of an example, the electrical loads 18 and the electrical supply network 20 are configured so as to operate with the overall alternating current voltage signal S2, the amplitude of which is greater than a minimal operating amplitude $A_{min}$ and the frequency of which is higher than a minimal operating frequency $F_{min}$ and lower than a maximal operating frequency $F_{max}$.

The overall alternating current voltage signal S2 corresponds to the voltage seen over the network 20 and resulting from the supply of electrical power to the network by each storage unit 16, via the local alternating current voltage signal $S1_{ij}$.

Each energy storage member 22 is capable of accumulating, that is to say, of storing, a maximal electrical energy $ESM_j$, referred to as maximum storable energy $ESM_j$, also known as maximal capacity. This maximum storable energy is for example expressed in Watt-hours (Wh).

Each control module 24 is capable of delivering a maximal electrical power, such as a maximum active (electrical) power $Pn_j$. Each control module 24 is capable of commanding-controlling the application of the local alternating current voltage signal $S1_{ij}$ to the electrical supply network 20, in order to the supply electrical power to the network and the loads 18.

Each control module 24 is capable of outputting the local voltage signal $S1_{ij}$, with an amplitude greater than the minimal operating amplitude $A_{min}$ and a frequency higher than the minimal operating frequency $F_{min}$ and lower than the maximal operating frequency $F_{max}$.

More precisely, each control module 24 is a direct current-alternating current (DC-AC) voltage converter and comprises a processing unit 28, as well as a signal application unit 30 for application of the local voltage signal $S1_{ij}$ to the electrical supply network 20. In subsequent sections, a single control module 24 will be described, the description being applicable to all of the control modules 24. The application of the local voltage signal $S1_{ij}$ corresponds to the generation of the local voltage signal $S1_{ij}$, that is to say to the outputting over the network 20 of local voltage signal $S1_{ij}$.

The control modules 24 are independent of each other, that is to say, they are not connected to a supervision system for supervising all of the storage units, which would be capable of commanding-controlling each storage unit 16 based on the data transmitted by other storage units 16 and/or on measurements performed in the proximity of other storage units 16.

The processing unit 28 includes a processor 32 and a memory storage 34.

The processor 32 is capable of executing the software applications included in the memory storage 32, of determining the local voltage signal $S1_{ij}$ and of transmitting the local voltage signal $S1_{ij}$ to the application unit 30, in order for the latter to apply it to the network 20.

The memory storage 34 comprises a first recording-storage software application 35 for recording and storing an initial frequency value that is predetermined, referred to as predetermined initial frequency, and a predetermined initial value of amplitude of the local voltage signal $S1_{ij}$, as well as a measurement software application 36 for measuring an active electrical power $P_{ij}$ delivered over the network 20.

The memory storage 24 further includes an energy determination software application 38 for determining the electrical energy stored $ES_{ij}$ in the storage member 22 and a second recording-storage software application 40 for recording and storing the maximum electrical energy storable $ESM_j$ by the storage member 22.

The memory storage 34 also includes a backup software application 42 for backup of an equation, that is to say of a function, which provides a set point value $A_{ij}$ for the amplitude of the local voltage signal $S1_{ij}$, a calculation software application 44 for calculating the set point value $A_{ij}$ and a signal modification software application 46 for modifying the local voltage signal $S1_{ij}$. The set point value $A_{ij}$ of the amplitude in subsequent sections is also referred to as amplitude set point $A_{ij}$.

The first recording-storage software application 35 is configured so as to, in response to the disconnection of the main electrical power supply member 14 from the network 20, and to the receiving of a trip command for tripping the supply of electrical power to the network 20 by the storage units 24, send to the application unit 30, the predetermined initial values of amplitude and frequency. The application unit 30 is then configured so as to apply over the network the local voltage signal as a function of the parameters, such as amplitude and frequency of the local voltage signal. The amplitude and frequency of the local voltage signal are, for example, equal to the predetermined initial amplitude value and the predetermined initial frequency, respectively.

Advantageously, the first recording-storage software application 35 is also capable of recording and storing the minimal operating amplitude $A_{min}$ and the maximum active electrical power $Pn_j$.

The measurement software application 36 is capable of measuring the active electrical power $P_{ij}$ outputted by the storage unit 16 and is associated with the measurement means, not represented, for measuring of a current and a voltage outputted from the storage unit 16. The active electrical power $P_{ij}$ outputted by the storage unit 16 corresponds to an electrical power $P_{ij}$ associated with the voltage signal $S1_{ij}$.

The backup software application 42 is specific to an equation that provides the set point value of the amplitude of the local voltage signal $S1_{ij}$, also known as set point value calculation equation. This equation is a function of the measured active power $P_{ij}$, of the determined stored electrical energy $ES_{ij}$ and of the stored maximum storable energy $ESM_j$.

In the subsequent sections, the stored electrical energy $ES_{ij}$ is also referred to as available electrical energy $ES_{ij}$ and corresponds to the amount of electrical energy stored in the storage member 22, that is to say to the capacity of the storage member 22, and is expressed in watt-hours (Wh).

As previously shown above for the state of the art, in an essentially resistive network, the act of causing varying of the amplitude of the local voltage signal as a function of the measured active power $P_{ij}$, makes it possible in accordance with the equation (2), to control the distribution of the active electrical power to be delivered to the loads 18, among the storage units 24. In addition, the fact of making the equation, which gives the set point value of the amplitude $A_{ij}$, dependent on available electrical energy and maximum storable electrical energy provides the ability, as will be explained later, to improve the distribution of the active electrical power to be delivered among the storage units 24 and to increase the time period during which the storage units 16 are capable of supplying electrical power to the electrical network 20, that is to say, of supplying electrical power to the loads 18.

The equation for calculation of the set point value is a decreasing function of the active electrical power $P_{ij}$ and an increasing function of the available electrical energy $ES_{ij}$. Preferably, this equation is a function of the measured active electrical power $P_{ij}$ and of a first ratio between the calculated available electrical energy $ES_{ij}$ and the maximum storable electric energy $ESM_j$. The first ratio represents the load state of the storage member 22.

The equation for calculation of the set point value is for example a first affine function. The first affine function depends on the measured active electrical power $P_{ij}$ and includes a negative slope, varying for example in a decreasing manner as a function of the first ratio.

By way of example, the first affine function satisfies the following:

$$A_{ij} = A' - \left(K1_j - K2_j * \frac{ES_{ij}}{ESM_j}\right) * P_{ij} \tag{5}$$

where A' corresponds to a desired value for the amplitude of the local voltage signal $S1_{ij}$ when the storage unit 16 is connected to the network 20 and no load 18 is connected to the network 20, that is to say, for example, at the predetermined initial value of amplitude; $P_{ij}$, $ES_{ij}$, $ESM_j$, $A_{ij}$, $K1_j$ and $K2_j$, are respectively, for the storage unit 16 having index j, the power measured by the measurement software application 36 at the temporal (time) instant having index i, the available electrical energy determined at the temporal instant having index i, the maximum storable electrical energy, the set point value of the amplitude, a first coefficient of predetermined value and a second coefficient of predetermined value.

Preferably, the first and second coefficients may be parameterised.

The first coefficient $K1_j$ and the second coefficient $K2_j$ satisfy for example that a product between, on the one hand, the difference between the first coefficient $K1_j$ and the second coefficient $K2_j$ and, on the other hand, the maximal power $Pn_j$ is identical and equal to a constant U for each of the storage units 16. In addition, if it is considered that A' and $A_{min}$ are identical for all of the storage units 16, the following equation is obtained:

$$(K1_j - K2_j) = \frac{(A' - A_{min})}{Pn_j} \tag{6}$$

In other words, the difference between the first coefficient and the second coefficient is equal to the ratio between, on the one hand, the difference between the desired value for the amplitude of the local voltage signal when the storage unit 16 is connected to the network 20 and no load 18 is connected over the network 20 and the minimal operating amplitude, and on the other hand, the maximum active power $Pn_j$.

Figure 2:
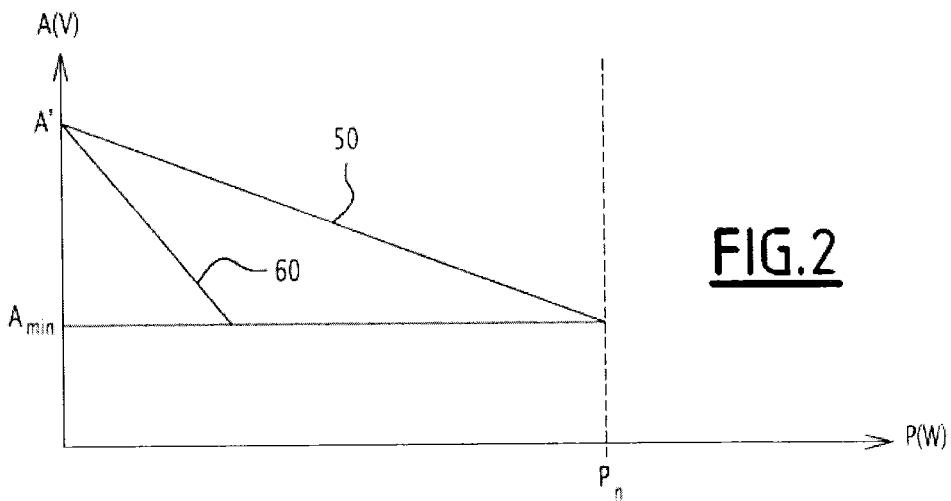
FIG. 2 is a set of two curves each representing the variation in a set point value of the amplitude of a voltage signal output by one of the electrical energy sources shown in FIG. 1, as a function of a measured electrical power being outputted from the said energy source.

FIG. 2 shows, for two given storage units 16, a first curve 50 and a second curve 60 representing the first affine function, the two storage units having two different values of the first ratio. More precisely, the first curve 50 corresponds to a value of the first ratio that is greater than that selected for the second curve 60. In other words, considering that the two given storage units 16 have the same maximum energy $ESM_j$, the first curve 50 represents, for example, the amplitude set point value calculated via the first affine function, when the available electrical energy $ES_{ij}$ is substantially equal to the maximum storable electrical energy $ESM_j$ and the second curve 60 represents, for example, the amplitude set point value calculated via the first affine function when the available electrical energy is lower than the maximum storable electrical energy, for example two times lower. It thus appears in FIG. 2, that the lower that the available electrical energy $ES_{ij}$ is, as compared to the maximum storable energy $ESM_j$, the greater the extent to which the amplitude set point $A_{ij}$ drastically decreases as a function of the measured active power $P_{ij}$. This makes it possible to have an amplitude set point $A_{ij}$ that is greater for the storage units in which the available electrical energy $ES_{ij}$ is higher as compared to the maximum storable energy $ESM_j$.

Thus, a storage unit 16, for which the first ratio is greater than that of any other storage unit 16, has a tendency to deliver more active electrical power to the electrical supply network 20. The storage members 22 therefore get discharged at different speeds as a function of the first ratio, which makes it possible to increase a time period during which the storage units 16 are capable of supplying electrical power to the loads, in particular when their respective storage members 22 do not store the same amount of energy $ES_{ij}$.

The calculation software application 44 is capable of calculating the set point value $A_{ij}$ of the amplitude based on the first affine function. Thus, the calculation software application 44 is for example capable of periodically calculating the amplitude set point value $A_{ij}$.

The modification software application 46, is capable of modifying the value of the amplitude of the local voltage signal $S1_{ij}$ in order for the value of the amplitude of the local voltage signal to be equal to the amplitude set point value calculated by the calculation software application 44. More precisely, the modification software application 46 is for example capable of fixing the amplitude of the voltage signal to be equal to the amplitude set point value calculated by the calculation software application 44, each time that a new amplitude set point value $A_{ij}$ is calculated by the calculation software application 44.

The modification software application 46 is, for example, capable of transmitting the amplitude set point value $A_{ij}$ to the application unit 30.

Figure 3:
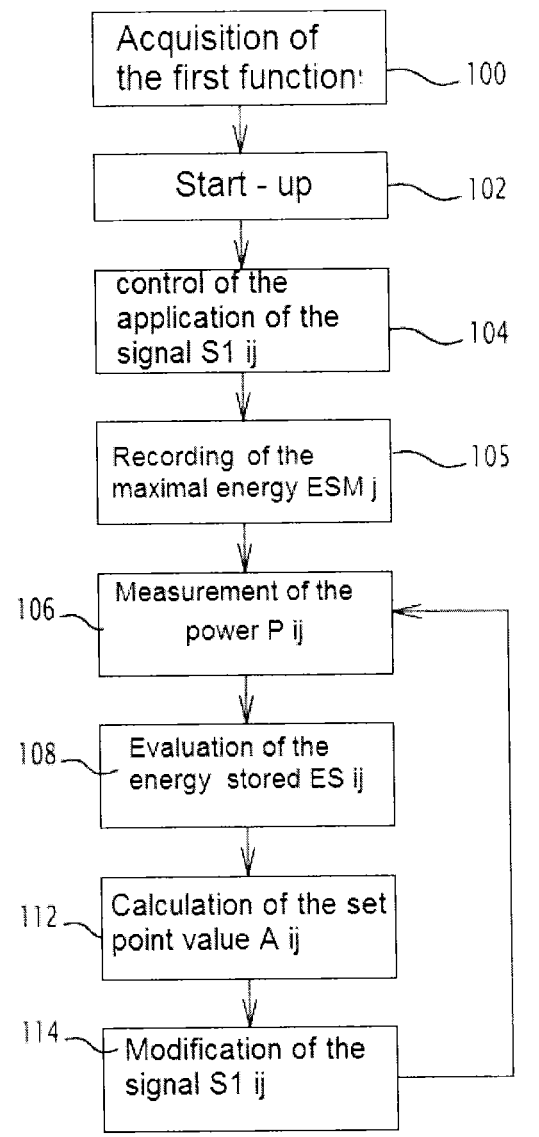
FIG. 3 is a flowchart of an electrical power control method for controlling the electrical power delivered to the electrical supply network by the electrical energy sources shown in FIG. 1.

The operation of the electrical system 12 will now be presented with the aid of the process flow diagram shown in FIG. 3.

During an initial step of acquisition 100, each storage unit 16 acquires, via the execution of the backup software application 42, the equation that provides the amplitude set point value $A_{ij}$, that is to say, the first affine function, and saves and stores this equation. Advantageously, the equation is determined by an operator, and then transmitted by the operator to the memory storage 34, and more precisely to the backup software application 42. In addition, the predetermined initial values of amplitude and frequency are saved and stored. Advantageously, the minimal operating amplitude $A_{min}$ and the respective maximum active electrical power $Pn_j$, are also saved and stored.

During a step of starting up 102, the main electrical power supply member is disconnected from the network 20 and the storage units 16 are commanded-controlled in order to supply electrical power to the network 20 and the loads 18.

Then, during a step of command-control 104, each control module 24 commands the application of the local alternating current voltage signal $S1_{ij}$ to the electrical supply network 20, for supplying electrical power to the loads 18. The local voltage signal $S1_{ij}$ has a frequency equal to the predetermined initial frequency value and an amplitude equal to the predetermined initial amplitude value.

Then, during a step 105 of recording and storing, each storage unit 16 records and stores the maximum electrical energy storable $ESM_j$ by the corresponding storage member 22, that is, the maximal capacity of the storage member 22.

Subsequently, during the course of a step 106 of measurement, each storage unit 16 measures, via the measurement software application 36, the active electrical power $P_{ij}$ that it outputs to the network 20.

During a subsequent step of determination 108, each control module 24, that is to say each storage unit 16, calculates or measures the electrical energy available $ES_{ij}$ in the corresponding storage member 22, that is, the available capacity of the storage member 22.

During the course of a calculation step 112, each storage unit 16 calculates the corresponding amplitude set point value $A_{ij}$ based on the acquired equation, that is to say, on the measured active power $P_{ij}$, the determined available electrical energy $ES_{ij}$ and on the maximum storable energy saved and stored $ESM_j$. The amplitude set point value $A_{ij}$ is thus calculated as a function of the available electrical energy determined and takes different non null values for various different non null values of the available electrical energy $ES_{ij}$.

Then, during a step of modification 114, each storage unit modifies the local voltage signal $S1_{ij}$. More precisely, the value of the amplitude of the voltage signal is modified so as to be equal to the amplitude set point value $A_{ij}$ determined in the step 112.

Finally, following the modification step 114, the step of measurement 106 is repeated and, more generally, the steps 106 to 114 are repeated. The periodicity with which these steps are repeated, is for example equal to 10 milliseconds.

The value of the amplitude set point $A_{ij}$ is thus regularly updated as a function of the measured active power $P_{ij}$ and the available electrical energy determined $ES_{ij}$, which makes it possible to optimise the distribution among the storage units 16, of the electrical power to be delivered to the loads 18. Indeed, the storage members 22 do not get discharged all at the same speed, but with a speed that is optimised based on the amount of energy that they store, that is to say the amount of energy remaining in each storage member 22. The time period during which the storage units are capable of supplying electrical power to the loads 18, that is to say in particular, of delivering the active electrical power required to operate the loads 18, is thus increased.

In the second embodiment shown in FIG. 4, the elements similar to those of the first embodiment bear the same reference numerals and only the differences between the first and second embodiments will be described in detail subsequently.

Figure 4:
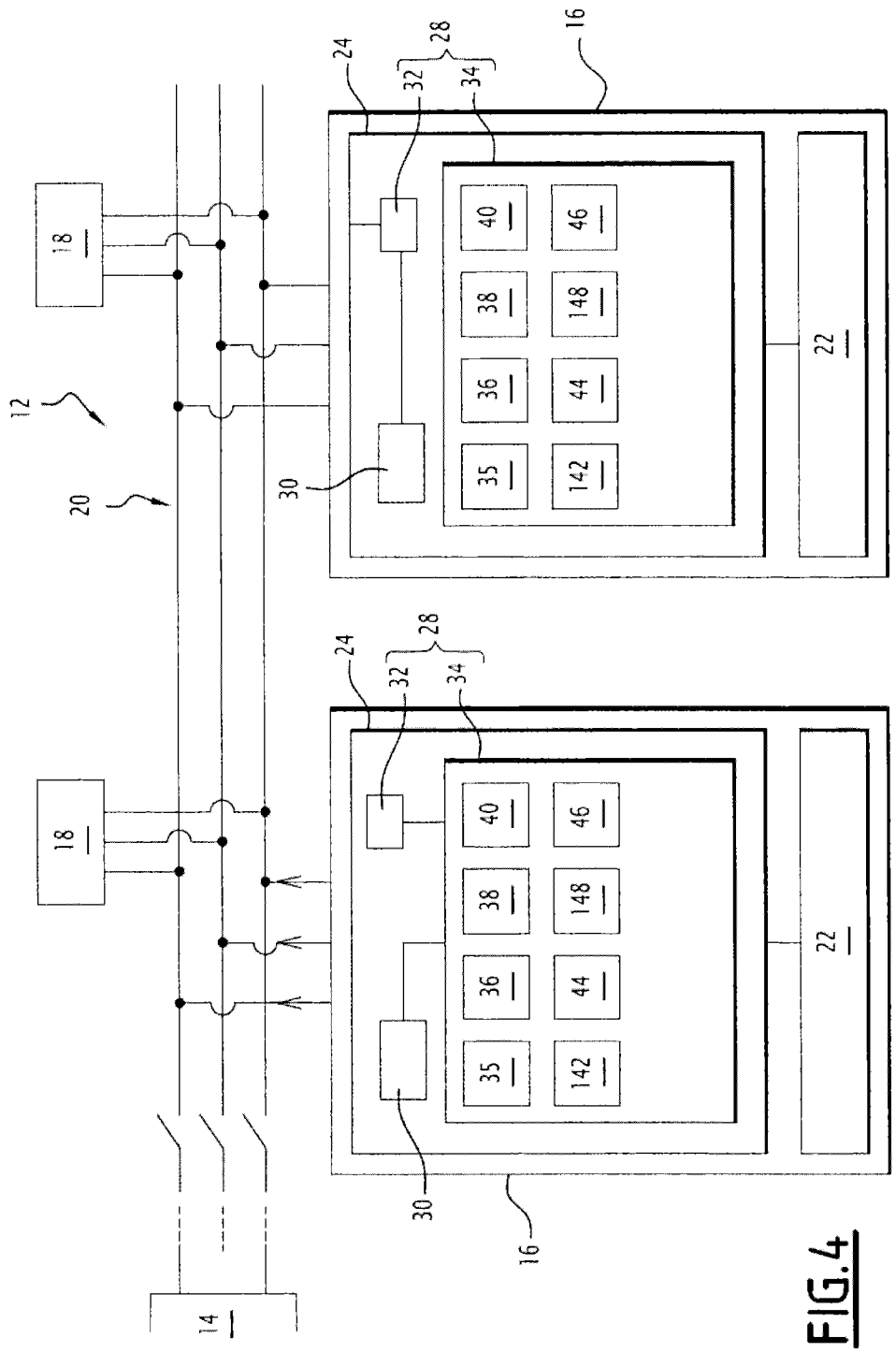
FIG. 4 is a representation similar to that shown in FIG. 1 according to a second embodiment of the invention.

In the electrical system 12 shown in FIG. 4, in comparison to the first embodiment, the memory storage 34 of each storage unit 16 comprises a first backup software application 142 for backing up the functions that each provide an amplitude set point value $A_{ij}$, replacing the backup software application 42 described in the first embodiment, and a selection software application 148 for selecting one of the functions that provide the value of the amplitude set point $A_{ij}$.

The backup software application 142 is for example capable of backing up the first affine function presented in the first embodiment, as well as a second affine function and a third affine function that each provide the amplitude set point value $A_{ij}$.

The backup software application 142 is also capable of recording and storing predetermined specific data, specific to the storage units 16. The specific data are, for example, an amplitude set point threshold $A_L$ and an active power threshold $P_L$.

The second affine equation is for example as follows:

$$A_{ij} = A_{min} + K3_{ij} * (Pn_j - P_{ij}), \text{ with} \quad (7)$$

$$K3_{ij} = \frac{\left(A' - \left(K1_j - K2_j * \frac{ES_{ij}}{ESM_j}\right)\right) * P_L - A_{min}}{Pn_j - P_L} \quad (8)$$

The third affine equation is as follows:

$$A_{ij} = A_{min} + K4_{ij} * (Pn_j - P_{ij}), \text{ with} \quad (9)$$

$$K4_{ij} = \frac{(A_L - A_{min})}{Pn_j - \frac{A' - A_L}{\left(K1_j - K2_j * \frac{ES_{ij}}{ESM_j}\right)}} \quad (10)$$

Prior to the selection of one of the functions that provide the value of the amplitude set point $A_{ij}$, corresponding to the amplitude set point value to be applied to the temporal instant having index i, the selection software application 148 is able to record and store a temporary amplitude set point value $A_{(i-1)j}$, corresponding to the amplitude set point value applied to the temporal instant having index i−1. By default, the temporary amplitude set point value is, for example, equal to A'.

The selection software application 148 is capable of comparing the temporary set point value $A_{(i-1)j}$ with the amplitude set point threshold $A_L$, as well as of comparing the measured active power $P_{ij}$ with the active power threshold $P_L$.

The selection software application 148 is also able to calculate a reference active power $P_{ref}$ and a reference amplitude set point value $A_{ref}$ based on the following calculation formulas:

$$P_{ref} = Pn_j - \left(\frac{Pn_j - P_L}{A_L - A_{min}}\right) * (A_{(i-1)j} - A_{min}), \text{ and} \quad (11)$$

$$A_{ref} = A_{min} + \left(\frac{A_L - A_{min}}{Pn_j - P_L}\right) * (Pn_j - P_{ij}), \quad (12)$$

The selection software application 148 is further capable of comparing the measured active power $P_{ij}$ with the reference active power $P_{ref}$ and the temporary amplitude set point value $A_{(i-1)j}$ with the reference amplitude set point value $A_{ref}$.

The selection software application 148 is thus capable of selecting one function out of the first, the second and the third affine functions, based on the results of the comparisons between the temporary amplitude set point value $A_{(i-1)j}$ and the amplitude set point threshold $A_L$, the active power $P_{ij}$ measured by the measurement software application 36 and the active power threshold $P_L$, the active power $P_{ij}$ measured by the measurement software application 36 and the reference active power $P_{ref}$, and between the temporary set point value $A_{(i-1)j}$ and the reference amplitude set point value $A_{ref}$.

For example, if the temporary amplitude set point value $A_{(i-1)j}$ is strictly greater than the amplitude set point threshold $A_L$ and if the measured active power $P_{ij}$ is strictly lower than the active power threshold $P_L$, then the selection software application 148 is capable of selecting the first affine function.

In addition, if the temporary amplitude set point value $A_{(i-1)j}$ is greater than or equal to the reference amplitude set point value $A_{ref}$ and if the measured active power $P_{ij}$ is greater than or equal to the active power threshold $P_L$, then the selection software application 148 is capable of selecting the second affine function, of which a slope is lower than that of the first affine equation.

If the temporary amplitude set point value $A_{(i-1)j}$ is less than or equal to the amplitude set point threshold $A_L$ and if the measured active power $P_{ij}$ is strictly less than the reference active power $P_{ref}$, then the selection software application 148 is capable of selecting the third affine function, of which a slope is greater than that of the first affine equation.

In other words, the selection software application 148 is capable of determining an equation that provides the set point value $A_{ij}$ of the amplitude of the local voltage signal $S1_{ij}$, corresponding to a piecewise linear function that depends in particular on the measured active power $P_{ij}$ and on the first ratio.

Thus, the selection software application 148 is designed so that, for each storage unit 16, the function selected, that is to say the determined equation, verifies that the amplitude set point value $A_{ij}$ is equal to the minimal operating amplitude $A_{min}$ when the measured active electrical power $P_{ij}$ is equal to the maximum active power $Pn_j$.

The calculation software application 44 is capable of calculating the set point value $A_{ij}$ of the amplitude based on the function selected by the selection software application 148.

Figure 5:
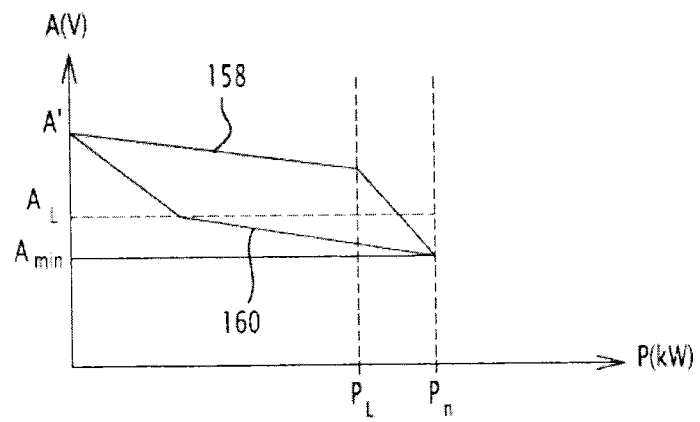
FIG. 5 is a set of two curves similar to that shown in FIG. 2 according to the second embodiment of the invention.

FIG. 5 presents a third curve 158 and a fourth curve 160 representing the equation that provides the set point value $A_{ij}$ of the amplitude of the local voltage signal $S1_{ij}$, for two different values of the first ratio. The third curve 158 is a first piecewise linear function determined on the basis of the first and second functions. The fourth curve 160 is a second piecewise linear function determined on the basis of the first and third functions.

The first piecewise linear function is equal to the first affine function in a first active power interval [0; PL] and the second affine function in a second active power interval [PL; Pnj]. The lower bound of the second interval being greater than or equal to the upper bound of the first interval and the second interval comprising the maximum active power Pnj. In the example described, the lower bound of the second interval is equal to the upper bound of the first interval.

Similarly, the second piecewise linear function is equal to the first affine function, in a third active power interval, and to the third affine equation in a fourth active power interval. The lower bound of the fourth interval being greater than or equal to the upper bound of the third interval and the fourth interval comprising the maximum active power Pnj. In the example described, the lower bound of the fourth interval is equal to the upper bound of the third interval.

As presented in FIG. 5, the first and second piecewise linear functions converge towards the minimal operating amplitude $A_{min}$, when the measured active power $P_{ij}$ is equal to the maximum active power $Pn_j$. The third curve 158 and the fourth curve 160 are each associated with one of the storage units 16.

The control modules 24 are thus configured so as to be able to deliver the maximum active power $Pn_j$, when the loads 18 require (request) it. More precisely, the first and second piecewise linear functions are adapted in order for the distribution of power to be delivered to the loads 18 to be optimised and for the storage units to each deliver over the network 20 an active electrical power capable of going up to the value of the maximum active power $Pn_j$.

As presented in FIG. 5, each control module 24 effectively controls the amplitude set point value $A_{ij}$ and thus the distribution of power among the storage units 16, up to the point where one of the third 158 and fourth 160 curves reaches an ordinate equal to the minimal operating amplitude value $A_{min}$. Thus, the fact of causing converging of the third 158 and fourth 160 curves toward the minimal operating amplitude $A_{min}$, when the measured active power $P_{ij}$ is equal to the maximum active power $Pn_j$, makes it possible to have an effective control of the distribution of the power to be delivered among the storage units 16, for an interval of power expanded in comparison to the first embodiment and equal to [0; $2Pn_j$] in the example shown in the FIGS. 4 and 5.

In other words, in the first embodiment, the assembly of storage units 16 is capable of delivering over the network 20 a maximum total power less than the sum of values of the maximum active power $Pn_j$, when the first ratio of at least one of the storage units 16 is other than 100%, while in the second embodiment, the maximum total power is equal to the sum of values of the maximum active power $Pn_j$ as long as the first ratio is strictly positive for all of the storage units 16, and more precisely as long as the first ratio is of a sufficient value in order for each storage unit to be capable of delivering the corresponding maximum active power $Pn_j$.

Figure 6:
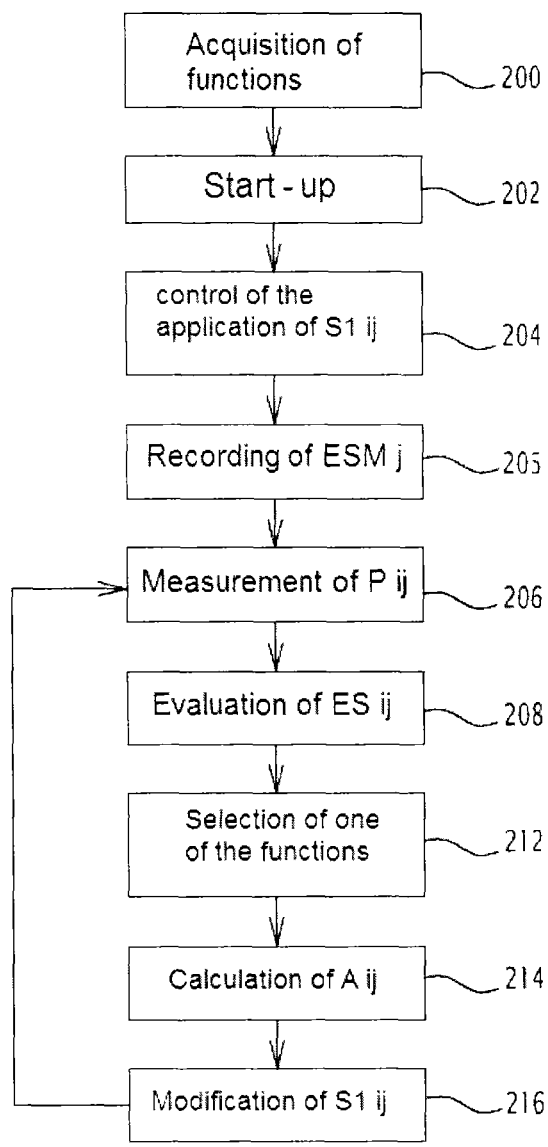
FIG. 6 is a flow chart similar to that shown in FIG. 3 according to the second embodiment of the invention.

The operation of the electrical system 12 according to the second embodiment will now be presented with the aid of the process flow diagram shown in FIG. 6.

During a first acquisition step 200, the first, second and third affine functions, the amplitude set point threshold $A_L$ and the active power threshold $P_L$ are recorded and stored. The first, second and third affine functions and the amplitude set point threshold $A_L$ and the active power threshold $P_L$ are, for example, entered by an operator during installation of the storage unit 16 on the network 20. In addition, the predetermined initial values of amplitude and frequency, as well as the minimal operating amplitude $A_{min}$ and the maximum active electrical power $Pn_j$, are also recorded and stored.

Then, the method includes the steps of starting up 202, command-control 204, recording and storage 205, measurement 206 and of determination 208 similar respectively to the steps 102, 104, 105, 106 and 108 presented for the first embodiment.

Then, during a selection step 212, the selection software application 148 records and stores the temporary amplitude set point value $A_{(i-1)j}$ and calculates the reference amplitude set point value $A_{ref}$ and the reference active power value $P_{ref}$. During the first execution of the selection step 102, the temporary amplitude set point value $A_{(i-1)j}$ is for example, set to be equal to A'.

Subsequently, the value of the temporary amplitude set point $A_{(i-1)j}$ is compared with the amplitude set point threshold $A_L$ and the reference amplitude set point value $A_{ref}$, while the active power $P_{ij}$ measured during the step 208 is compared with the active power threshold $P_L$ and the reference active power $P_{ref}$. Then, the selection software application selects the function to be used for calculation of the amplitude set point $A_{ij}$ in a manner similar to what has been presented here above.

Next, in a calculation step 214, the amplitude set point $A_{ij}$ is calculated based on the function selected in the step 212 and therefore notably based on the measured active power $P_{ij}$, the available electrical energy determined $ES_{ij}$ and the maximum storable energy recorded and stored $ESM_j$.

Finally, a modification step 216 similar to the step 114 presented for the first embodiment is performed. Then, following the modification step 216, the measurement step 206 is repeated.

According to a third embodiment of the invention, an electrical system 12 as presented in FIG. 1 is used. However, in the third embodiment, the backup software application is different from the backup software application 42 presented in the first embodiment.

Thus, according to the third embodiment, the backup software application is capable of recording and storing, or acquiring a fourth function that provides the amplitude set point $A_{ij}$ of the local voltage signal $S1_{ij}$, different from the first affine function. The fourth function gives the set point value $A_{ij}$ of the amplitude of the local voltage signal as a function of the active power $P_{ij}$, available electrical energy $ES_{ij}$, and the maximum storable energy $ESM_j$.

Figure 7:
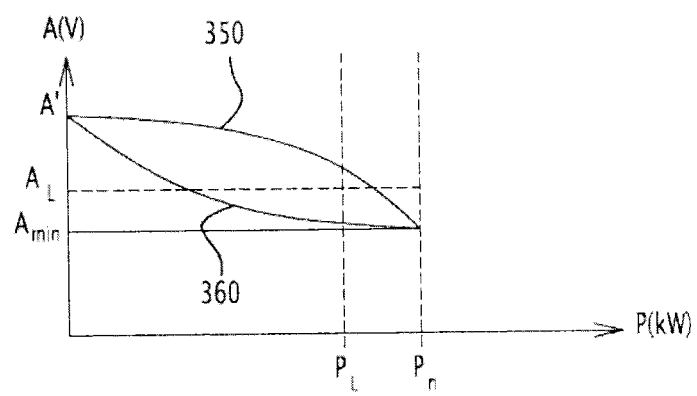
FIG. 7 is a set of two curves similar to that shown in FIGS. 2 and 5 according to a third embodiment of the invention.

The fourth function is a decreasing function of the active electrical power and increasing function of the available electrical energy $ES_{ij}$. The fourth function is, as shown in FIG. 7, a continuous function of the measured active power $P_{ij}$ which converges to the minimal operating amplitude $A_{min}$ when the measured active power $P_{ij}$ is equal to the maximum active power $Pn_j$.

The fourth function satisfies for example the following:

$$A_{ij} = A' - \left(\frac{(A' - A_{min})}{Pn_j}\right) * P_{ij} + dk * (C_{ij} - 0.5) * P_{ij}^{1+C_{ij}} * (Pn_j - P_{ij})^{2-C_{ij}}, \quad (13)$$

with $C_{ij} = \dfrac{ES_{ij}}{ESM_j}$ where dk is a parameter of predetermined value, determined in an empirical fashion.

FIG. 7 shows the fifth 350 and sixth 360 curves, representing the result of the fourth function, for two different values of the first ratio each corresponding to one of the storage units 16. The fifth 350 and sixth 360 curves converge to the minimal operating amplitude $A_{min}$ when the measured active power $P_{ij}$ is equal to the maximum active power $Pn_j$. The fifth 350 and sixth 360 curves globally present the shape of the third 158 and fourth 160 curves respectively.

The advantages of the third embodiment are similar to those of the second embodiment. An additional advantage of the third embodiment is the simplification of the function to be used to calculate the amplitude set point that is no longer a piecewise affine function, but a continuous function.

The operation of the electrical system 12 according to the third embodiment is similar to that presented for the first embodiment and follows the same flow chart as that shown in FIG. 3, apart from the fact that during the acquisition step, the function recorded and stored is the fourth function.

In the three embodiments set forth here above, the amplitude set point value $A_{ij}$ is a function of the measured active power $P_{ij}$, which is known from the state of the art, but also according to the invention from the available electrical energy $ES_{ij}$. This set point value is generally a function of the first ratio, which thereby provides the ability to increase the time period during which the storage units are capable of supplying power to the network 20, in particular when the first ratio is different between the storage units 16.

In addition, according to the second and third embodiments, the fact that the equation for calculation of the set point value is tantamount to a decreasing function of the measured active power $P_{ij}$, which converges to the minimal operating value when the measured active power $P_{ij}$ is equal to the maximum active power $Pn_j$, makes it possible for the storage units 16 to deliver a high total power over the network 20 when the loads require a high power. The storage units 16 are for example capable of delivering to the network a maximum total power equal to the sum of values of their maximum active power $Pn_j$ and the distribution among the storage units 16 of the electrical power to be delivered to the loads 18 is effective and efficient. In other words, in the example shown in FIGS. 5 and 7, the maximum total power output from all of the storage units 16 over the network 20 is equal to the sum of values of the maximum active power $Pn_j$, as long as the first ratio is strictly positive for all of the storage units 16.

The second and third embodiments provide both an optimised operation in terms of maximum total power deliverable by the storage units 16 and time period during which the storage units 16 are capable of supplying electrical power to the electrical supply network 20.

By way of a variant, the invention is also applicable to an inductive network 20 and control modules 24 are then capable of controlling the frequency of the local voltage signal $S1_{ij}$ on the basis of the measured active power $P_{ij}$. According to this variant embodiment, the operation is identical to that which has previously been presented above, and the amplitude set point value $A_{ij}$ is replaced by a frequency set point value $F_{ij}$, the desired value A' of the amplitude of the local voltage signal, when the storage unit 16 is connected on the network and no load 18 is connected on the network is replaced by a desired value F' of the frequency of the local voltage signal when the storage unit 16 is connected to the network and no load 18 is connected on the network. It is for example equal to the predetermined initial frequency, and the minimal operating amplitude $A_{min}$ is for example replaced by the minimal operating frequency $F_{min}$. Furthermore, in this variant, the first $K1_j$ and second $K2_j$ coefficients of predetermined values are for example replaced by third $K3_j$ and fourth $K4_j$ coefficients of predetermined values, the amplitude set point threshold $A_L$ is replaced by a frequency set point threshold $F_L$ and the reference amplitude set point value $A_{ref}$ is replaced by a reference frequency set point value $F_{ref}$.

In this variant the first affine equation is for example equal to:

$$F_{ij} = F' - \left(K3_j - K4_j * \frac{ES_{ij}}{ESM_j}\right) * P_{ij} \tag{14}$$

Figure 8:
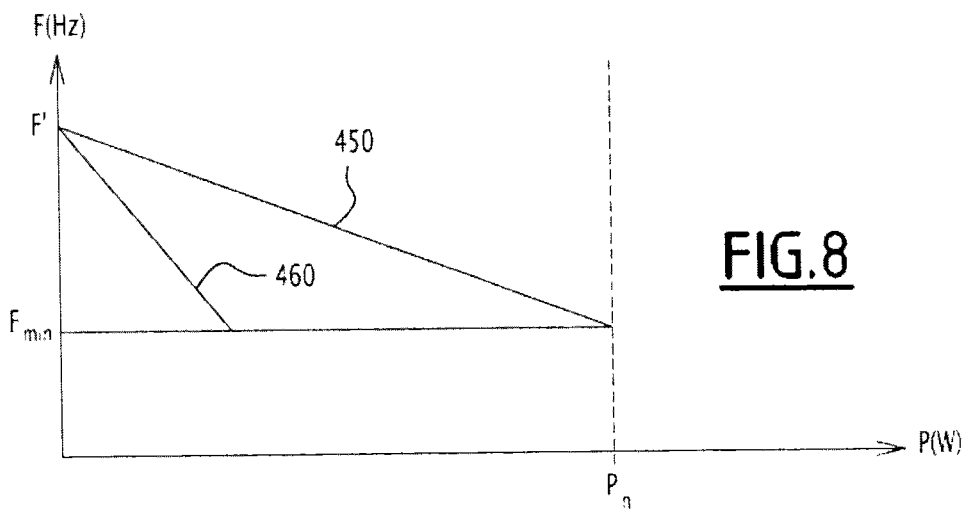
FIG. 8 is a set two similar curves to that shown in FIG. 2 for an electrical supply network of the inductive type.
Figure 9:
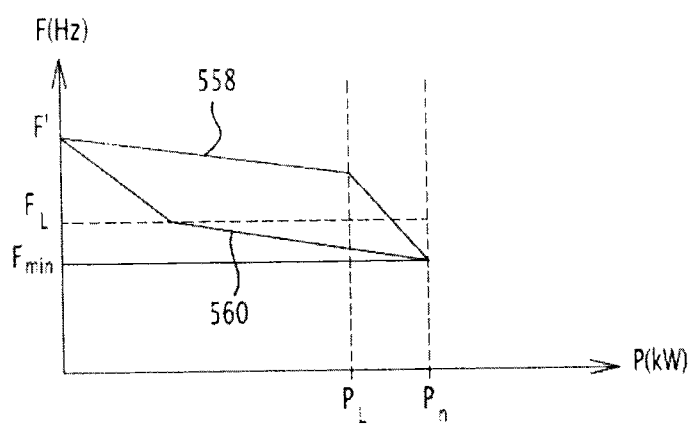
FIG. 9 is a set of two curves similar to that shown in FIG. 5 for an electrical supply network of the inductive type.
Figure 10:
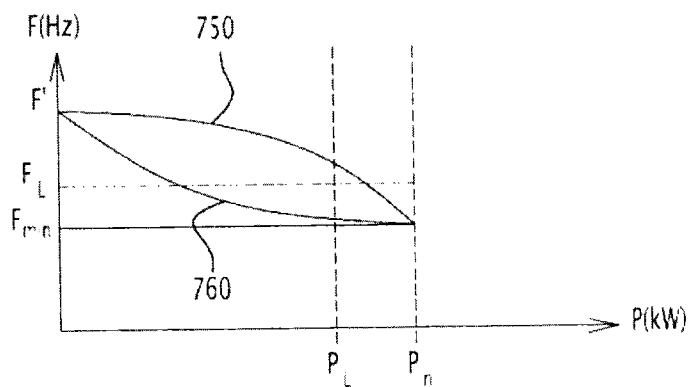
FIG. 10 is a set of two curves similar to that shown in FIG. 7 for an electrical supply network of the inductive type.

Moreover, in the variant embodiment mentioned above, instead of the FIGS. 2, 5 and 7, the FIGS. 8, 9 and 10 are obtained which are respectively similar to the FIGS. 2, 5 and 7 and for which the reference numerals are increased by 400 as compared respectively to FIGS. 2, 5 and 7. FIGS. 8, 9 and 10 correspond respectively to the first, second and third embodiments, which are suitable for this embodiment.

In the embodiments presented here above, the source of electrical energy, that is to say, the source of electrical power, corresponds to a storage unit and more generally to a power source, that is capable of operating as a voltage generator and capable of storing a limited amount of electric energy. The storage unit is for example a battery, a fuel cell or a diesel generator that has a limited reservoir.

The invention claimed is:

1. A control method for controlling the electrical power delivered over an electrical supply network by at least two sources of electrical energy, each electrical energy source being connected to the network and comprising a storage member for storing electrical energy, the method comprising for each energy source:
    applying by the respective electrical energy source an alternating current voltage signal over the electrical supply network for the supplying of electrical power to the network, with a parameter of the voltage signal having a predetermined initial value;
    measuring an electrical power associated with the voltage signal applied;
    determining an electrical energy stored in the storage member;
    calculating a set point value for the voltage signal parameter as a function of the measured power; and
    modifying the voltage signal, the value of the voltage signal parameter being modified to be equal to the calculated set point value,
    wherein during the calculation step, the set point value is calculated as a function of the stored electrical energy determined and is a decreasing function of the electrical power and an increasing function of the stored electrical energy,
    wherein each energy source is capable of delivering a maximal power to the network and is configured in order that the parameter of the voltage signal is greater than a minimal operating value, and
    wherein for each electrical energy source, during the calculating, the set point value is equal to the minimal operating value when the measured electrical power is equal to the maximal power.

2. The method according to claim 1, wherein the parameter of the voltage signal is selected from an amplitude of the voltage signal and a frequency of the voltage signal, depending on the type of network.

3. The method according to claim 1, wherein, previously during the calculation step, the method further comprises, for each energy source:
    recording a value for maximal electrical energy that is able to be stored by the storage member;

wherein, during the calculating, the set point value is a function of a first ratio between the stored electrical energy and the maximum electrical energy.

4. The method according to claim 3, wherein during the calculating, the set point value is determined based on a first affine function, the first affine function being dependent on the measured electrical power and having a negative slope.

5. The method according to claim 4, wherein the first affine equation satisfies the following equation:

$$B_{ij} = B' - \left(K1_j - K2_j * \frac{ES_{ij}}{ESM_j}\right) * P_{ij},$$

where i, j are integer indices corresponding respectively to a given time instant and to an identifier of the electrical energy source, B' is a desired value for the parameter of the voltage signal when the electrical energy source is connected to the network and no load is connected to the network, and $P_{ij}$, $ES_{ij}$, $ESM_j$, $B_{ij}$, $K1_j$, and $K2_j$ are respectively the power, the stored electrical energy, the maximal electrical energy, the set point value, a first coefficient of predetermined value and a second coefficient of predetermined value.

6. The method according to claim 5, wherein each energy source is capable of delivering a maximal power to the network, and wherein a product between, on the one hand, the difference between the first coefficient and the second coefficient and, on the other hand, the maximal power is identical for each of the energy sources.

7. The method according to claim 1, wherein during the calculating, the set point value is calculated based on a continuous piecewise linear function which is equal to a first affine function, being dependent on the measured electrical power and having a negative slope, for a first power interval and to a second affine function for a second power interval, the second interval comprising the maximal power, and the lower bound of the second interval being greater than or equal to the upper bound of the first interval.

8. The method according to claim 1, wherein each energy source is capable of delivering a maximal power $Pn_j$ to the network and in order for the parameter of the voltage signal to be greater than a minimal operating value $B_{min}$, and wherein, during the calculation step, the voltage signal parameter is calculated on the basis of the following equation:

$$B_{ij} = B' - \left(\frac{(B' - B_{min})}{Pn_j}\right) * P_{ij} + dk * (C_{ij} - 0.5) * P_{ij}^{1+C_{ij}} * (Pn_j - P_{ij})^{2-C_{ij}};$$

with $C_{ij} = \frac{ES_{ij}}{ESM_j}$ where i, j are integer indices corresponding respectively to a given time instant and to an identifier of the electrical energy source, B' is a desired value for the parameter of the voltage signal when the electrical energy source is connected to the network and no load is connected to the network, dk is a parameter of predetermined value, and $P_{ij}$, $ES_{ij}$, $ESM_j$, $B_{ij}$, are respectively the power, the stored electrical energy, the maximal electrical energy, and the set point value.

9. An electrical system comprising:

at least two sources of electrical energy, each electrical energy source being connected to the electrical supply network including a storage storing electrical energy, and circuitry configured to control the storage, wherein each circuitry being further configured to:

control application of an alternating voltage signal over the electrical supply network for the supply of electrical power to the network, with a parameter of the voltage signal having a predetermined initial value, control measuring of an electrical power associated with the signal voltage applied, determine an electrical energy stored in the storage member, calculate a set point value of the voltage signal parameter as a function of the measured power, and control modification of the voltage signal that is capable of modifying the value of the voltage signal parameter in order for the value of the voltage signal parameter to be equal to the calculated set point value, wherein the circuitry is further configured to calculate the set point value as a function moreover of the stored electrical energy determined, wherein each energy source is capable of delivering a maximal power to the network and is configured in order that the parameter of the voltage signal is greater than a minimal operating value, and wherein for each electrical energy source, the circuitry is further configured to fix the set point value equal to the minimal operating value when the measured electrical power is equal to the maximal power.

* * * * *